Feb. 11, 1947.  J. H. MILWARD  2,415,601
WOOD-TRIMMING APPARATUS
Filed June 7, 1945   2 Sheets-Sheet 2

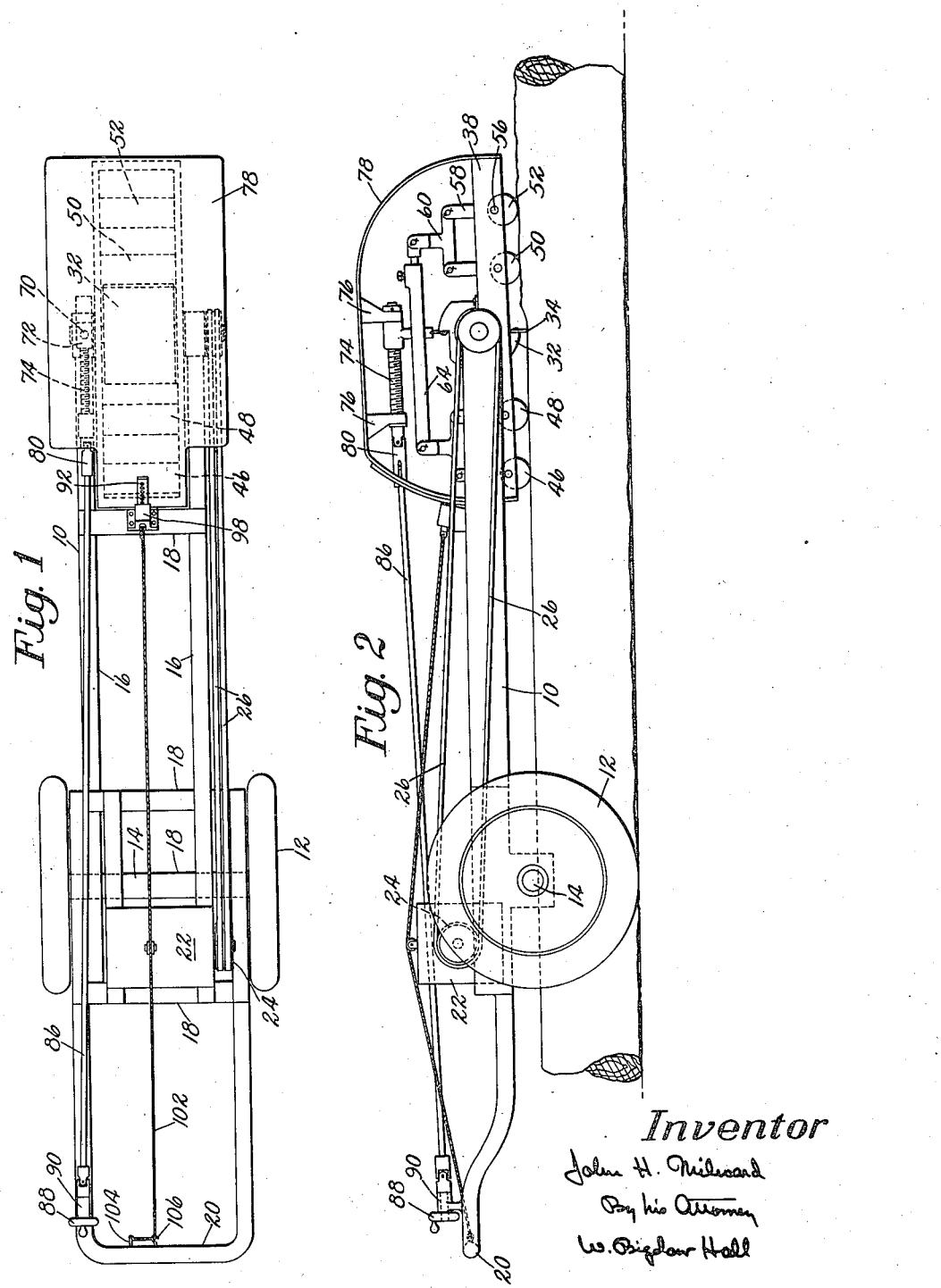

Inventor
John H. Milward
By his Attorney
W. Bigelow Hall

Patented Feb. 11, 1947

2,415,601

UNITED STATES PATENT OFFICE 2,415,601

WOOD-TRIMMING APPARATUS

John H. Milward, Albany, Ga., assignor, by direct and mesne assignments, to The Forest Machinery Company, Inc., a corporation of Florida Application June 7, 1945, Serial No. 598,077

5 Claims. (Cl. 144—117)

This invention relates to wood-trimming apparatus and more particularly to apparatus for trimming logs to form them into railroad ties and the like.

An object of the present invention is to provide an improved power-operated wood-trimming apparatus which is portable and can be employed in trimming logs on the ground with a minimum of skill on the part of the operator. To this end and in accordance with a feature of the invention, the apparatus comprises a carriage supported by a pair of wheels which are arranged to straddle a log to be operated upon and to rest on the ground, there being a cutter mounted on the carriage for rotation about a horizontal axis spaced from the axis of the wheels, and means associated with the cutter for regulating the depth of cut.

In order that the apparatus may be used on rough ground and that the contour of the ground over which the wheels of the apparatus travel in traversing the log will not affect the action of the cutter on the log, in accordance with a further feature of the invention, the means for regulating the depth of cut is in the form of a gage pivoted on the support about the axis of the cutter, the gage including work-engaging elements positioned at opposite sides of the cutter. Thus vertical movements of the supporting wheels relatively to the log by reason of irregularities in the surface of the ground, causing the carriage to pivot about the axis of the cutter, will not disturb the relationship between the gage, the cutter and the log.

In accordance with a still further feature of the invention, the log-engaging members of the gage are adjustable to vary the depth of cut, there being means accessible from the handle of the apparatus for effecting this adjustment. In order that the apparatus may be operated in the manner of a jointer when it is desired to provide the log with a surface which is smoother than that required by a railroad tie, the log-engaging members at one side of the cutter are adjustable heightwise relatively to those at the other side of the cutter.

Provision is also made, in accordance with a still further feature of the invention, for locking the gage relatively to the support to facilitate use of the apparatus at the ends of the log, there being a member for operating the locking means accessible from the handle of the machine.

The above and other features of the invention, including various details of construction and novel combinations of parts, will now be described in detail by reference to the drawings and pointed out in the claims.

In the drawings,

Fig. 1 is a plan view of one form of apparatus embodying the invention;

Fig. 2 is a side elevation of the apparatus shown in Fig. 1;

Figure 3:
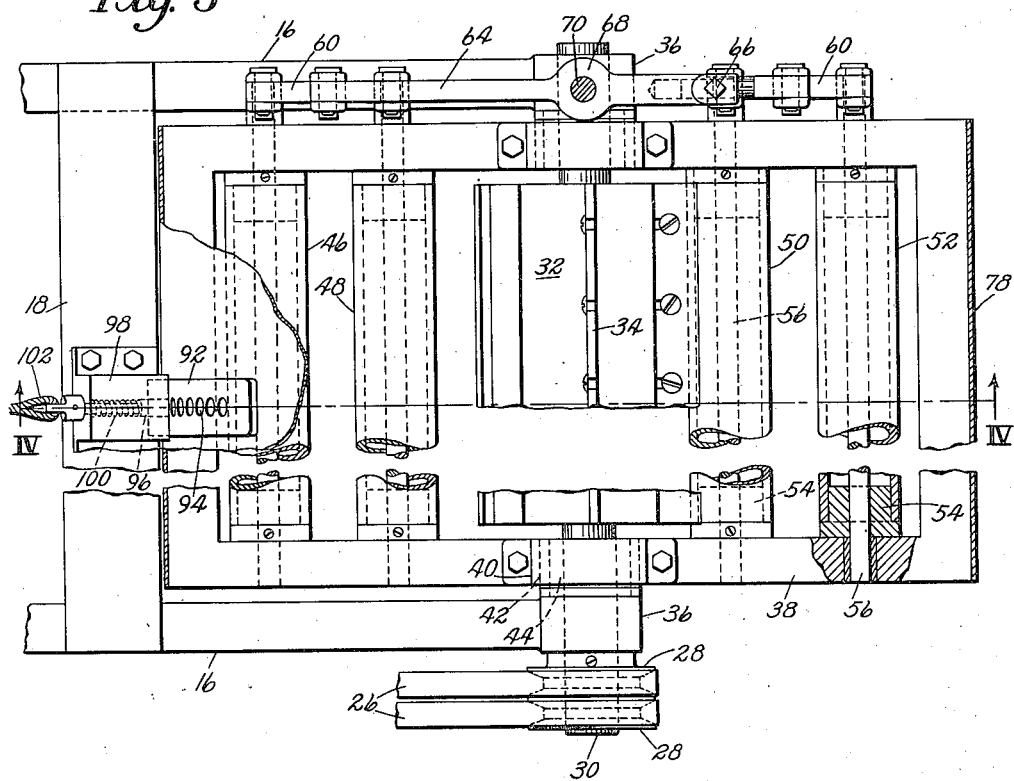
Fig. 3 is a plan view, partly in section, of the work-engaging portion of the apparatus illustrating the cutter and gage.

The apparatus is illustrated as including a carriage 10 supported by a pair of wheels 12 of sufficient size and suitably spaced on an axle 14 so that they will straddle a log of considerable size which may be operated upon by the trimmer. The carriage may be of any suitable construction and is shown to comprise a pair of side frame members 16 (Fig. 1) which extend forwardly of the axle a considerable distance, and are interconnected by cross frame members 18. Secured to the side frame members and extending rearwardly of the axle is a handle 20 by which the apparatus may be guided by the operator.

Mounted on the carriage just rearwardly of the axle 14 is a motor 22 which may be of any suitable type such as an electric motor or an internal combustion engine. Carried by the shaft of the motor are pulleys 24 connected by a pair of V-belts 26 to pulleys 28 (Fig. 3) mounted on the shaft 30 of a rotary cutter 32 having a plurality of cutter blades 34. The cutter shaft 30 is journaled in bearings 36 formed in the forward end of the carriage. From the foregoing, it will be apparent that as the apparatus is moved to operate on a log, the carriage will pivot about the axis of the wheels as the latter move up and down relatively to the log in response to inequalities in the ground on which the log rests. The weight of the cutter and associated mechanism is sufficient to maintain the cutter in its proper position on the log, although this weight is partially counterbalanced by the motor 24 thereby facilitating handling of the apparatus, particularly when the apparatus is being moved from one log to another. If desired, to facilitate operation of the apparatus, the motor 24 may also be connected to the wheels 12 through a suitable gear reduction, thereby providing power for propulsion of the apparatus.

In order that the depth of cut may be properly controlled and regulated, a gage is associated with the cutter. As illustrated, the gage includes a frame 38 provided with bearing blocks 40 journaled on bushings 42 which are in turn carried by sleeves 44 which extend inwardly from the bearings 36 in which the cutter is journaled. By this construction, the gage frame 38 is free to pivot about the axis of the cutter. Journaled for free rotation in the gage frame at opposite sides of the cutter are gage rolls 46, 48, 50 and 52, there being two at each side of the cutter, although it should be understood that more may be employed if desired. In order to permit heightwise adjustment of the rolls, they are mounted on eccentric bearings 54, which, as shown most clearly in Fig. 3 are secured to shafts 56 journaled in opposite sides of the gage frame. By turning the shafts 56, and the bearings with them, the rolls are moved heightwise of the frame.

Figure 4:
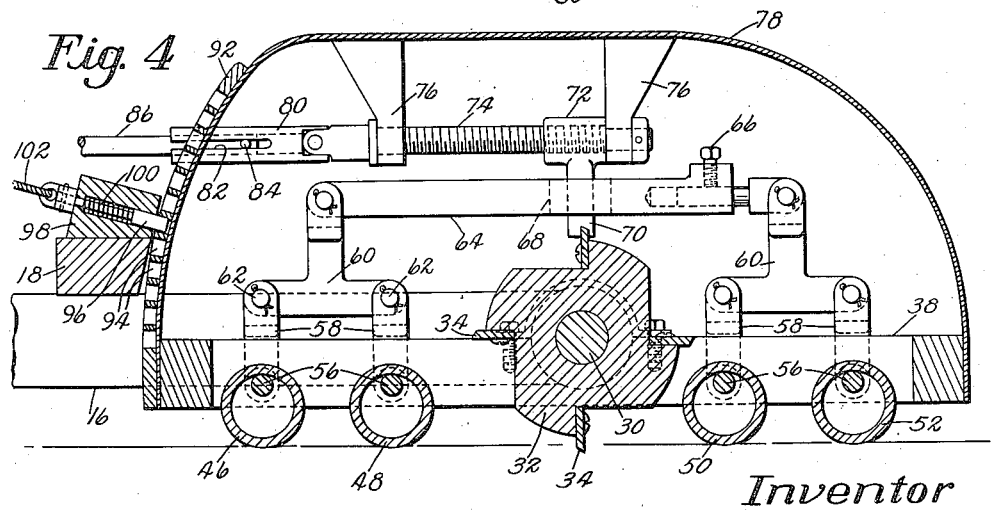
Fig. 4 is a section on line IV—IV of Fig. 3.

Provision is made for effecting simultaneous adjustment of all the gage rolls in accordance with the desired depth of cut. For this purpose, the shafts 56 extend outwardly beyond one side of the frame 38 and have secured thereto upwardly extending arms 58, the upper ends of which may be bifurcated to receive the ends of T-shaped links 60 (Fig. 4) connected to the arms by pins 62. The links 60 have upwardly extending arms which are connected by a two-part extensible link 64, the two parts of the link being secured together by a set screw 66. By loosening the screw 66, the two parts of the link 64 may be relatively adjusted so that the heightwise position of the rolls at one side of the cutter may be adjusted relatively to the rolls at the other side of the cutter for a purpose which will appear as the description proceeds.

The central portion of the link 64 is provided with an enlarged portion 68 having a vertical aperture to receive a pin 70 depending from a block 72 whereby movement of the block and pin lengthwise of the machine will act through the links 60, 58 to turn the eccentric bearings 54 and cause simultaneous adjustment of the gage rolls.

The block 72 is in threaded engagement with a screw 74 journaled in brackets 76 depending from a hood 78 carried by the frame 38 providing a guard for the cutter and the gage. The brackets 76 are carried by a portion of the hood which extends beyond the end of the cutter as shown most clearly in Fig. 1. The screw 74 is arranged to be operated from the handle of the machine to facilitate adjustment of the gage rolls by the operator. The screw extends rearwardly of the rear bracket 76 and is pivoted to a sleeve 80 provided with a longitudinally extending slot 82 in which is received a pin 84 carried by one end of a flexible shaft 86. The other end of the shaft 86 extends rearwardly to the handle 20 of the machine as shown in Fig. 2 and is connected to a hand crank 88 journaled in a bearing block 90 mounted on the handle. Rotation of the crank 88 turns the screw 74 thereby to adjust the gages. The flexible shaft 86 is slidably connected to the sleeve 80 as shown because, in the use of the apparatus, there may be considerable relative movement between the carriage and the gage frame, due either to irregularities in the terrain or in the log.

In the normal use of the apparatus, the gage rolls will follow the contour of the log, but by providing a plurality of gage rolls arranged as shown, slight irregularities in the surface of the log at the beginning of the trimming operation will not greatly affect the action of the cutter. For example, a slight depression in the log may be passed over without lowering the cutter, as there are two supporting rolls at each side of the cutter. However, the cutter will follow the general contour of the log which is entirely satisfactory in trimming logs for use as railroad ties. It ordinarily will take two or more passes of the cutter to trim each side of the log, and this is usually done by moving the apparatus forwardly from one end of the log to the other, and then pulling it back, subsequently moving it forward again if a third pass is required. If, as occasionally happens, the contour of the log is too irregular, this mode of operation may not provide sufficiently flat surfaces to produce a satisfactory tie. Accordingly, the rolls at opposite sides of the cutter may be spaced at different distances from the cutter axis. As shown clearly in Fig. 4, the rolls 50, 52 are nearer the cutter than the rolls 48, 46 respectively. If a log of very irregular contour is being trimmed, the apparatus is moved forwardly over the log, but instead of then pulling it back over the log, the entire apparatus is turned around and then moved forwardly over the log in the reverse direction. The uneven spacing of the gage rolls causes the cutter to follow the contour of the log differently as it is thus moved back and forth over the log, tending to produce a flatter surface.

It is desirable, when operating on the ends of the log, to lock the gage to the carriage so that it cannot swing about the cutter axis. Secured to the rearward portion of the hood is a curved bar 92 having a series of apertures 94 arranged to receive a pin 96 slidable in a block 98 carried by one of the cross frame members 18. A spring 100 urges the pin into locking engagement with the bar 92 thereby locking the gage frame rigidly to the carriage. The pin 96 includes a reduced shank portion which extends rearwardly of the block 98 and has secured to it a rearwardly extending flexible cable 102 connected at 104 to the handle of the machine. By pulling rearwardly on the cable, the pin is withdrawn from locking engagement with the bar 92 and the cable may be passed over a hook 106 on the handle 20, thereby maintaining the pin in retracted position.

Whereas in using the apparatus for forming ties it is not necessary to produce an extremely smooth cut, such a cut may at times be desirable for some purposes. Accordingly, the apparatus may be used in a manner analogous to that of a wood jointer. Under such conditions, the screw 66 is loosened and the gage rolls 50, 52 are raised relatively to the rolls 46, 48 by decreasing the length of the link 64. The rolls 50, 52 then provide between them a table which is on a higher level than the table provided by the rolls 46, 48.

In using the apparatus to form ties, the gage frame will pivot about the axis of the cutter in response to irregularities in the surface of the log, the gage rolls always maintaining their proper relationship with the surface of the log. The ground on which the logs lie may be very rough or irregular so that the wheels 12 by which the carriage is supported will move heightwise relatively to the log. The movement of the carriage caused thereby will have no effect on the cutter as the pivotal mounting of the gage frame will insure the proper relationship between the cutter and the work regardless of the position of the carriage. After one side of the log has been trimmed, the log is turned and the operation is repeated and so on until the log has been trimmed to four flat sides. The trimming is effected without the necessity of supporting the logs on any special apparatus, or providing tracks or the like for supporting the trimming apparatus, but the trimming may be effected wherever the logs happen to fall when the tree is cut down. The apparatus may be operated without any great degree of skill on the part of the operator, and a great saving over the expense of hand labor commonly employed in present day practice is made possible by its use.

Having thus described my invention, what I claim as new and desire to secure by Letters Patent of the United States is:

1. Log-trimming apparatus comprising a rotary cutter, a carriage, means mounting said cutter in said carriage for rotation about a horizontal axis, a pair of wheels engageable with the surface on which the log rests, at opposite sides of the log, an axle connecting said wheels, means mounting said carriage on said axle remote from said cutter, a gage assembly pivotally carried by said carriage for movement about the axis of said cutter, said assembly including log-engaging means extending parallel to the axis of the cutter forwardly and rearwardly thereof for regulating the depth of cut, and means for adjusting said log-engaging means heightwise of said cutter to vary the depth of cut.

2. Log-trimming apparatus comprising a rotary cutter, a carriage, means mounting said cutter in said carriage for rotation about a horizontal axis, a pair of wheels engageable with the surface on which the log rests, at opposite sides of the log, an axle connecting said wheels, means mounting said carriage on said axle remote from said cutter, a gage assembly pivotally carried by said carriage for movement about the axis of said cutter, said assembly including log-engaging means extending parallel to the axis of the cutter forwardly and rearwardly thereof for regulating the depth of cut, and operator-controlled means for locking said gage assembly against pivotal movement relatively to said frame.

3. Log-trimming apparatus comprising a rotary cutter, a carriage, means mounting said cutter in said carriage for rotation about a horizontal axis, a pair of wheels engageable with the surface on which the log rests, at opposite sides of the log, an axle connecting said wheels, means mounting said carriage on said axle remote from said cutter, a gage assembly pivotally carried by said carriage for movement about the axis of said cutter, said assembly including a plurality of log-engaging means at each side of the cutter extending parallel to the axis thereof, means mounting the log-engaging means at opposite sides of the cutter for relative heightwise adjustment, and means for simultaneously adjusting all of said log-engaging means heightwise of said cutter.

4. In combination, a two-wheeled support arranged to straddle a log to be trimmed, a carriage pivotally mounted on said support and extending forwardly and rearwardly thereof, a cutter journaled in one end of said carriage for rotation about a horizontal axis, a handle carried by the opposite end of said carriage for enabling the carriage to be guided by the operator, a drive motor between said handle and said support, means connecting said motor to said cutter, a frame carried by said carriage for pivotal movement about the axis of said cutter and extending forwardly and rearwardly thereof, members carried by said frame for engagement with the log at opposite sides of the cutter for controlling the depth of cut, means for locking said frame rigidly to said carriage, and means accessible from the handle of the machine for controlling said locking means.

5. In combination, a two-wheeled support arranged to straddle a log to be trimmed, a carriage pivotally mounted on said support and extending forwardly and rearwardly thereof, a cutter journaled in one end of said carriage for rotation about a horizontal axis, a handle carried by the opposite end of said carriage for enabling the carriage to be guided by the operator, a drive motor between said handle and said support, means connecting said motor to said cutter, a frame carried by said carriage for pivotal movement about the axis of said cutter and extending forwardly and rearwardly thereof, a plurality of rolls eccentrically journaled in said frame at each side of said cutter, means for simultaneously adjusting all of said rolls heightwise of said cutter, means enabling adjustment of the rolls at one side of the cutter independently of the rolls at the other side of the cutter, and means for locking said frame against pivotal movement relatively to said carriage thereby to permit operation of the apparatus at the extremities of the log.

JOHN H. MILWARD.

REFERENCES CITED

The following references are of record in the file of this patent:

UNITED STATES PATENTS

| Number | Name | Date |
| --- | --- | --- |
| 942,474 | Veronneau | Dec. 7, 1909 |
| 1,331,992 | Jespersen et al | Feb. 24, 1920 |
| 1,549,098 | Magnusson | Aug. 11, 1925 |
| 2,342,267 | Goff | Feb. 22, 1944 |
| 1,858,015 | Hodgson | May 10, 1932 |

FOREIGN PATENTS

| Number | Country | Date |
| --- | --- | --- |
| 117,455 | Australian | Aug. 31, 1943 |